(12) United States Patent
Price et al.

(10) Patent No.: US 7,068,832 B1
(45) Date of Patent: Jun. 27, 2006

(54) LOCKBOX IMAGING SYSTEM

(75) Inventors: Joanne Price, Houston, TX (US);
Sumit Mathur, Sugar Land, TX (US);
Paul Mao, Houston, TX (US)

(73) Assignee: The Chase Manhattan Bank, New York, NY (US)

( * ) Notice: Subject to any disclaimer, the term of this patent is extended or adjusted under 35 U.S.C. 154(b) by 0 days.

(21) Appl. No.: 09/569,179

(22) Filed: May 11, 2000

Related U.S. Application Data

(60) Provisional application No. 60/133,577, filed on May 11, 1999.

(51) Int. Cl.
*G06K 9/00* (2006.01)

(52) U.S. Cl. ..................................................... 382/137

(58) Field of Classification Search ........ 382/135–140, 382/100, 320–321; 235/379, 454; 707/35; 705/1, 33, 45
See application file for complete search history.

(56) References Cited

U.S. PATENT DOCUMENTS

| | | | |
|---|---|---|---|
| 3,653,480 A | | 4/1972 | Yamamoto et al. |
| 4,205,780 A | * | 6/1980 | Burns et al. ................. 235/454 |
| 4,321,672 A | | 3/1982 | Braun et al. |
| 4,396,985 A | | 8/1983 | Ohara |
| 4,495,018 A | | 1/1985 | Vohrer |
| 4,617,457 A | | 10/1986 | Myers |
| 4,672,377 A | | 6/1987 | Murphy |
| 4,700,055 A | | 10/1987 | Kashkashian, Jr. |
| 4,752,877 A | | 6/1988 | Roberts |
| 4,797,913 A | | 1/1989 | Kaplan |
| 4,799,156 A | | 1/1989 | Shavit |

(Continued)

FOREIGN PATENT DOCUMENTS

EP 1014318 6/2000

(Continued)

OTHER PUBLICATIONS

Annual Report Pursuant to Section 13 or 15(d) of the Securities Exchange Act of 1934, Intelidata Technologies Corporation, Commission File No. 000-21685, pp. 1-10 (out of 55). Fiscal year ended Dec. 31, 2001.

(Continued)

*Primary Examiner*—Jose L. Couso
*Assistant Examiner*—Tom Y. Lu
(74) *Attorney, Agent, or Firm*—Hunton & Williams LLP

(57) ABSTRACT

A system and method for imaging and capturing information from checks and documents contained in a lockbox remittance. A computer workstation is used to generate and print a header sheet that includes information identifying the check. The header sheet is appended to the front of the documents and the document are imaged using a scanner. Identifying information from each of the documents is used to create a data record for each document. In parallel to the scanning of the documents, the checks are scanned and images are created for each of the checks. Additionally, identifying information from each of the checks (e.g., the check number, the amount, etc.) is manually input into a database, thus creating a data record for each check. Once all of the data entry and scanning has been completed, an automatic association process takes place in which the check data records, the check images, the document data records and the document images are all automatically associated and cross-referenced such that the system recreates an electronic version of the original batch of physical papers. All of the associated data and images are contained in a database, from which all of the information for a lockbox customer can be electronically retrieved over the Internet.

6 Claims, 3 Drawing Sheets

U.S. PATENT DOCUMENTS

| | | |
|---|---|---|
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,122,950 A | 6/1992 | Mee |
| 5,136,502 A | 8/1992 | Van Remortel et al. |
| 5,175,682 A | 12/1992 | Higashiyama |
| 5,198,975 A | 3/1993 | Baker et al. |
| 5,225,978 A | 7/1993 | Peterson |
| 5,237,159 A | 8/1993 | Stephens |
| 5,283,829 A | 2/1994 | Anderson |
| 5,287,269 A | 2/1994 | Dorrough |
| 5,311,594 A | 5/1994 | Penzias |
| 5,321,238 A | 6/1994 | Watanabe |
| 5,326,959 A | 7/1994 | Perazza |
| 5,336,870 A | 8/1994 | Hughes |
| 5,350,906 A | 9/1994 | Brody |
| 5,367,581 A | 11/1994 | Van Horn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,422,467 A * | 6/1995 | Graef et al. ................. 235/379 |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt |
| 5,479,494 A | 12/1995 | Clitherow |
| 5,483,445 A | 1/1996 | Pickering |
| 5,484,988 A | 1/1996 | Hills |
| 5,504,677 A | 4/1996 | Pollin |
| 5,506,691 A | 4/1996 | Bednar et al. |
| 5,513,250 A | 4/1996 | McAllister |
| 5,532,464 A | 7/1996 | Josephson et al. |
| 5,544,040 A | 8/1996 | Gerbaulet |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,666,493 A | 9/1997 | Wojcik et al. |
| 5,677,955 A | 10/1997 | Doggett |
| 5,679,938 A | 10/1997 | Templeton |
| 5,679,940 A | 10/1997 | Templeton |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder |
| 5,715,298 A | 2/1998 | Rogers |
| 5,715,314 A | 2/1998 | Payne |
| 5,715,399 A | 2/1998 | Bezos |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |
| 5,770,843 A | 6/1998 | Rose |
| 5,774,553 A | 6/1998 | Rosen |
| 5,784,696 A | 7/1998 | Meinikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross |
| 5,870,456 A | 2/1999 | Rogers |
| 5,870,721 A | 2/1999 | Norris |
| 5,870,723 A | 2/1999 | Pare |
| 5,870,725 A * | 2/1999 | Bellinger et al. ............. 705/45 |
| 5,873,072 A | 2/1999 | Kight |
| 5,874,717 A * | 2/1999 | Kern et al. ................. 235/379 |
| 5,883,810 A | 3/1999 | Franklin et al. |
| 5,884,288 A | 3/1999 | Chang et al. |
| 5,895,455 A * | 4/1999 | Bellinger et al. ............. 705/35 |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,023,684 A * | 2/2000 | Pearson ....................... 705/35 |

| | | | |
|---|---|---|---|
| 6,032,133 A | 2/2000 | Hilt et al. | |
| 6,032,137 A | 2/2000 | Ballard | |
| 6,035,281 A | 3/2000 | Crosskey et al. | |
| 6,035,285 A | 3/2000 | Schlect et al. | |
| 6,035,287 A | 3/2000 | Stallaert et al. | |
| 6,038,553 A | 3/2000 | Hyde, Jr. | |
| 6,041,312 A | 3/2000 | Bickerton et al. | |
| 6,041,315 A | 3/2000 | Pollin | |
| 6,044,362 A | 3/2000 | Neely | |
| 6,052,674 A | 4/2000 | Zervides et al. | |
| 6,058,380 A | 5/2000 | Anderson et al. | |
| 6,058,381 A | 5/2000 | Nelson | |
| 6,061,665 A | 5/2000 | Bahreman | |
| 6,065,675 A | 5/2000 | Teicher | |
| 6,067,524 A | 5/2000 | Byerly et al. | |
| 6,070,150 A | 5/2000 | Remington et al. | |
| 6,070,798 A | 6/2000 | Nethery | |
| 6,073,104 A | 6/2000 | Field | |
| 6,073,113 A | 6/2000 | Guinan | |
| 6,076,072 A | 6/2000 | Libman | |
| 6,078,907 A | 6/2000 | Lamm | |
| 6,081,790 A | 6/2000 | Rosen | |
| 6,085,168 A | 7/2000 | Mori et al. | |
| 6,088,683 A | 7/2000 | Jalili | |
| 6,088,685 A | 7/2000 | Kiron | |
| 6,088,686 A | 7/2000 | Walker et al. | |
| 6,092,056 A | 7/2000 | Tull, Jr. et al. | |
| 6,098,053 A | 8/2000 | Slater | |
| 6,098,070 A | 8/2000 | Maxwell | |
| 6,105,011 A | 8/2000 | Morrison, Jr. | |
| 6,108,639 A | 8/2000 | Walker et al. | |
| 6,110,044 A | 8/2000 | Stern | |
| 6,111,858 A | 8/2000 | Greaves et al. | |
| 6,115,690 A | 9/2000 | Wong | |
| 6,119,106 A | 9/2000 | Mersky et al. | |
| 6,119,107 A | 9/2000 | Polk | |
| 6,125,354 A | 9/2000 | MacFarlane et al. | |
| 6,128,602 A | 10/2000 | Northington et al. | |
| 6,128,603 A | 10/2000 | Dent et al. | |
| 6,129,273 A | 10/2000 | Shah | |
| 6,138,118 A | 10/2000 | Koppstein et al. | |
| 6,144,946 A | 11/2000 | Iwamura | |
| 6,148,293 A | 11/2000 | King | |
| 6,149,056 A | 11/2000 | Stinson et al. | |
| 6,181,837 B1 | 1/2001 | Cahill et al. | |
| 6,185,544 B1 | 2/2001 | Sakamoto et al. | |
| 6,202,054 B1 | 3/2001 | Lawlor et al. | |
| 6,205,433 B1 | 3/2001 | Boesch et al. | |
| 6,227,447 B1 | 5/2001 | Campisano | |
| 6,233,566 B1 | 5/2001 | Levine | |
| 6,278,981 B1 | 8/2001 | Dembo | |
| 6,289,322 B1 | 9/2001 | Kitchen et al. | |
| 6,301,379 B1 | 10/2001 | Thompson et al. | |
| 6,301,567 B1 * | 10/2001 | Leong et al. | 705/33 |
| 6,304,858 B1 | 10/2001 | Mosler | |
| 6,321,212 B1 | 11/2001 | Lange | |
| 6,338,047 B1 | 1/2002 | Wallman | |
| 6,338,049 B1 | 1/2002 | Walker et al. | |
| 6,393,409 B1 | 5/2002 | Young | |
| 6,405,173 B1 | 6/2002 | Honarvar et al. | |
| 6,415,259 B1 | 7/2002 | Wolfinger et al. | |
| 6,418,419 B1 | 7/2002 | Nieboer | |
| 6,418,420 B1 | 7/2002 | DiGiorgio et al. | |
| 6,490,568 B1 | 12/2002 | Omara et al. | |
| 6,493,685 B1 | 12/2002 | Ensel et al. | |
| 6,529,885 B1 * | 3/2003 | Johnson | 705/64 |
| 6,574,377 B1 | 6/2003 | Cahill et al. | |
| 6,578,015 B1 | 6/2003 | Haseltine et al. | |
| 6,609,113 B1 | 8/2003 | O'Leary et al. | |
| 6,609,125 B1 | 8/2003 | Layne et al. | |
| 6,629,081 B1 | 9/2003 | Cornelius et al. | |
| 6,704,714 B1 | 3/2004 | O'Leary et al. | |
| 6,721,715 B1 | 4/2004 | Nemzow | |
| 2001/0018739 A1 | 8/2001 | Anderson et al. | |
| 2001/0037309 A1 | 11/2001 | Carlyle St. Vrain | |
| 2001/0047334 A1 | 11/2001 | Nappe et al. | |
| 2001/0047489 A1 | 11/2001 | Ito et al. | |
| 2002/0012445 A1 | 1/2002 | Perry | |
| 2002/0013728 A1 | 1/2002 | Wilkman | |
| 2002/0026394 A1 | 2/2002 | Savage et al. | |
| 2002/0038363 A1 | 3/2002 | MacLean | |
| 2002/0052842 A1 | 5/2002 | Schuba et al. | |
| 2002/0069134 A1 | 6/2002 | Solomon | |
| 2002/0077978 A1 | 6/2002 | O'Leary et al. | |
| 2002/0087468 A1 | 7/2002 | Ganesan et al. | |
| 2002/0091635 A1 | 7/2002 | Dilip et al. | |
| 2002/0107770 A1 | 8/2002 | Meyer | |
| 2002/0107788 A1 | 8/2002 | Cunningham | |
| 2002/0111837 A1 | 8/2002 | Aupperle | |
| 2002/0138398 A1 | 9/2002 | Kalin et al. | |
| 2002/0170966 A1 | 11/2002 | Hannigan et al. | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0046218 A1 | 3/2003 | Albanese et al. | |
| 2003/0097335 A1 | 5/2003 | Muskowitz et al. | |
| 2003/0105641 A1 | 6/2003 | Lewis | |
| 2003/0208421 A1 | 11/2003 | Vicknair et al. | |
| 2003/0208441 A1 | 11/2003 | Poplawski et al. | |
| 2003/0225663 A1 | 12/2003 | Horan | |
| 2003/0233305 A1 | 12/2003 | Solomon | |
| 2004/0078328 A1 | 4/2004 | Talbert et al. | |

FOREIGN PATENT DOCUMENTS

| | | |
|---|---|---|
| WO | WO 91/16691 | 10/1991 |
| WO | WO 93/08545 | 4/1993 |
| WO | WO 96/08783 | 3/1996 |
| WO | WO 98/09260 | 3/1998 |
| WO | WO 02/063432 | 8/2002 |

OTHER PUBLICATIONS

Block, Blockbuster running test of a stored value card, The American Banker, Sep. 1, 1995, 2 pages.

Card Flash Daily Payment Card News, CardWeb.com Inc., Sep. 23, 2004, 3 pages.

CES/NaBANCO introduces stored value card technology; blockbuster video is first merchant partner, Business Wire, Jan. 15, 1996, 2 pages.

Chase Manhattan introduces new FEDI payables product, Case Management News, May, 1995.

Bills, Chase Pact Done, What's Next for Web Vendors?, Technology, Jun. 3, 2002, p. 23., 3 pages.

Reinbach, Chase steps up treasury system, Bank Systems & Technology, Nov., 1995.

Chasing the global trend, Cash Management News, Dec., 1995.

Priya, Clearing House Enumerates e-Payments Ills, American Banker The Financial Services Daily, Aug. 13, 2002, 2 pages.

Marjanovic, Corporate Services: Chase Gears Up Global Payments Systems Series: 16, American Banker, Sep. 11, 1995.

Gluck, Creating a Global Cash-Management Game Plan, Bank Systems Technology, Feb., 1997.

Fidelity Helps Fund Sellers Trim the Taxes They'll Owe, Wall Street Journal, Jan. 7, 2002, 2 pages.

First Data markets stored-value cards, Cards International, Jan. 30, 1996, 2 pages.

Norris et al., First data unit develops blockbuster cash card, Omaha World Herald, Sunrise Edition, Jan. 19, 1996, 2 pages.

Harsh Truth: Your Investments Likely Won't Make Any Money, 2 pages.

Money, Initial Launch to 200 Credit Unions, Jun. 27, 2002, pp. 1-3.

Decovny, Net Scopt, Banking Technology, May 1997.

Nokia Announces the World's First NFC Enabled Mobile Product for Contactless Payment and Ticketing, http://www.prnewswire.com/cgi-bin/stories.pl?ACCT=109&STORY=, Feb. 9, 2005.

Goode, On Profit, Loss and the Mysteries of the Mind, The New York Times, Nov. 5, 2002, 4 pages.

Operating in a multi-currency environmemt, Asiamoney, Oct. 1995.

Payment data, www.paymentdata.com, Nov. 8, 2004.

Payment Data Systems Files Patent on Debit Card Payment Solution, American City Business Journals, Inc., Press Release Mar. 5, 2004.

Maher et al., Today's Issues in Treasury Management, Payor's Prescription for Painless Migration to Electronic Healthcare Payments and Remittance Advices, PNCBANK, www.treasury.pncbank.com, Dec. 2001, 6 pages.

Maher et al., Today's Issues in Treasury Management, Provider's Prescription for Painless Migration to Receipt Electronic Healthcare Payments and Remittance Advices, PNCBANK, www.treasury.pncbank.com, 8 pages.

Systems spell change for foreign exchange, Global Investor, Nov. 1996.

French, Tech Stocks: Market Movers, Investors Worry CheckFree Being Chased from Its Own Game, Jun. 20, 2002, pp. 1-4.

Technology, In Brief: Wachovia-InteliDate Deal, May 7, 2002.

Zuckerman, The Hedge-Fund Craze, The Wall Street Journal Online, Jun. 12, 2002, 17 pages.

McDonald, The Stars in the Sky Flicker, And Fund Stars Do The Same, The Wall Street Journal, Jan. 15, 2003, 3 pages.

Visa & Carnegie Mellon Plan Online Payment Scheme, Newsbyte News Network, Feb. 15, 1995, 2 pages.

Financial News, "Wells Fargo Rolls Out Nationwide Lockbox Check Conversion," PR Newswire Association, Apr. 22, 2003, 2 pages.

* cited by examiner

LOCKBOX IMAGING SYSTEM

CROSS REFERENCE TO RELATED APPLICATIONS

This application is based on and claims priority to U.S. Provisional Patent Application No. 60/133,577, filed on May 11, 1999, entitled DOCULINK IMAGING SYSTEM.

FIELD OF THE INVENTION

The present invention relates to methods and systems for imaging documents and providing access to such images and more particularly to methods and systems for imaging checks and other documents associated with lockbox processing operations.

BACKGROUND OF THE INVENTION

Lockbox processing is employed by entities that receive a large number of negotiable instruments, for example checks, and other documents associated with the negotiable instruments such as invoices. An example of an entity that makes use of lockbox processing would be a telephone company that mails out hundreds of thousands if not millions of invoices and receives payment on the invoices from its customers via checks. Such entities typically outsource such lockbox processing to a financial institution which is able to directly process the negotiable instruments (i.e., the checks). Typically, these business entities have one or more accounts with the financial institution into which the proceeds from the checks are deposited and thereafter available for use by the business entity.

It has been recognized both by the financial institution and the business entities that it is desirable to provide timely information regarding the checks (or receipts) received in a lockbox to the business entity. Such information consists of particular data related to the check, for example, the remitter name, check number, bank number, routing number, payment amount, etc. This information is typically gathered and stored in a computer database for rapid retrieval buy or on behalf of the business entity.

Storage of the information in a computer database is typically accomplished by entering the desired data related to the checks and into an index file containing fields. The index files are then appropriately addressed and cross cataloged such that they may be retrieved on command and the information contained therein presented to the business entity.

In addition to the data associated with a check, it has been found desirable to also provide an actual image of the check for use by the business entity. Typically, the informational data associated with the check and the image of the check are cross referenced such that the data and the check image can be simultaneously retrieved and reviewed. Such check imaging capability is well known in the art.

Some prior art systems have attempted to image the checks and the documents received in an envelope in a lockbox processing center. One such system placed the check and its associated documents on a conveyer belt type arrangement for imaging. Such a system is not suitable for a high volume lock box processing center since the checks must again be separately processed by the conventional financial processing systems. The redundancies therefore induced by this prior art system are not acceptable for any high volume processing center.

Although financial service providers have been able to provide customers with the ability to search the databases containing the index and image files of the financial instruments (i.e., the checks), it is not possible heretofore to provide data and images with respect to the other documents associated with the checks such as the invoice submitted with the check.

SUMMARY OF THE INVENTION

In order to overcome the deficiencies of the prior art, the present invention provides a system and method for imaging and capturing information from the documents remitted with a check in a lockbox remitted envelope and associating the document images and data with the image and data of the check itself.

A lockbox remittance typically contains an envelope, a check and one or more documents associated with the check. A typical document associated with a check is an invoice that was provided by the business to the remitter, who then includes the invoice and check in the envelope for mailing. As the envelope is received by the lockbox processing center, it is opened and the check, the envelope and any documents included therewith are retained together as a group. Several groups of checks and associated documents are processed together as a batch.

An operator uses a computer workstation to generate a header sheet that includes the lockbox batch number, the lockbox owner (the business entity), the check number and optionally, the amount of the check. In a preferred embodiment, the header sheet includes a bar code containing all of the above information. Once the header sheet has been printed, the check and its associated documents can be separated. The header sheet is appended to the front of the document or stack of documents comprising the batch and each of the documents in the batch, including the header sheet, is imaged and the images are stored in a on an image file server. Either before or after the documents are scanned, identifying information from each of the documents (e.g., the invoice number on the document) is manually input into a database, thus creating a data record for each document. In parallel to the scanning of the documents, the checks are scanned and images are created for each of the checks. Additionally, identifying information from each of the checks (e.g., the check number, the amount, etc.) is manually input into a database, thus creating a data record for each check.

Once all of the data entry and scanning has been completed, an association process takes place in which the check data records, the check images, the document data records and the document images for each group are all associated and cross-referenced such that the system has now recreated an electronic version of the original group of physical papers. All of the associated data and images are contained in a memory, from which all of the information for a lockbox customer can be retrieved.

The present invention envisions several ways in which the lockbox customer may receive its information. In a first embodiment, all the check and document images and check and document data are burned onto a Compact Disk Read only Memory (CD-ROM) which is then sent to the customer. The customer has the appropriate software to enable it to search, sort, view and print any of the information as it desires. In a second embodiment, all of the customer data is formatted into a bulk file and transmitted electronically to the customer over the Internet, by a private network, or through a dial-up connection. In a third embodiment, the customer information is stored on permanent storage on the system and the customer logs onto the system and selectively search, sort, retrieve, view and print the information electronically over the Internet.

Other features and advantages of the present invention will become apparent from the following description of the invention which refers to the accompanying drawings.

BRIEF DESCRIPTION OF THE DRAWING(S)

For the purposes of illustrating the present invention, there is shown in the drawings a form which is presently preferred, it being understood however, that the invention is not limited to the precise form shown by the drawings in which.

DETAILED DESCRIPTION OF THE INVENTION

Figure 1:
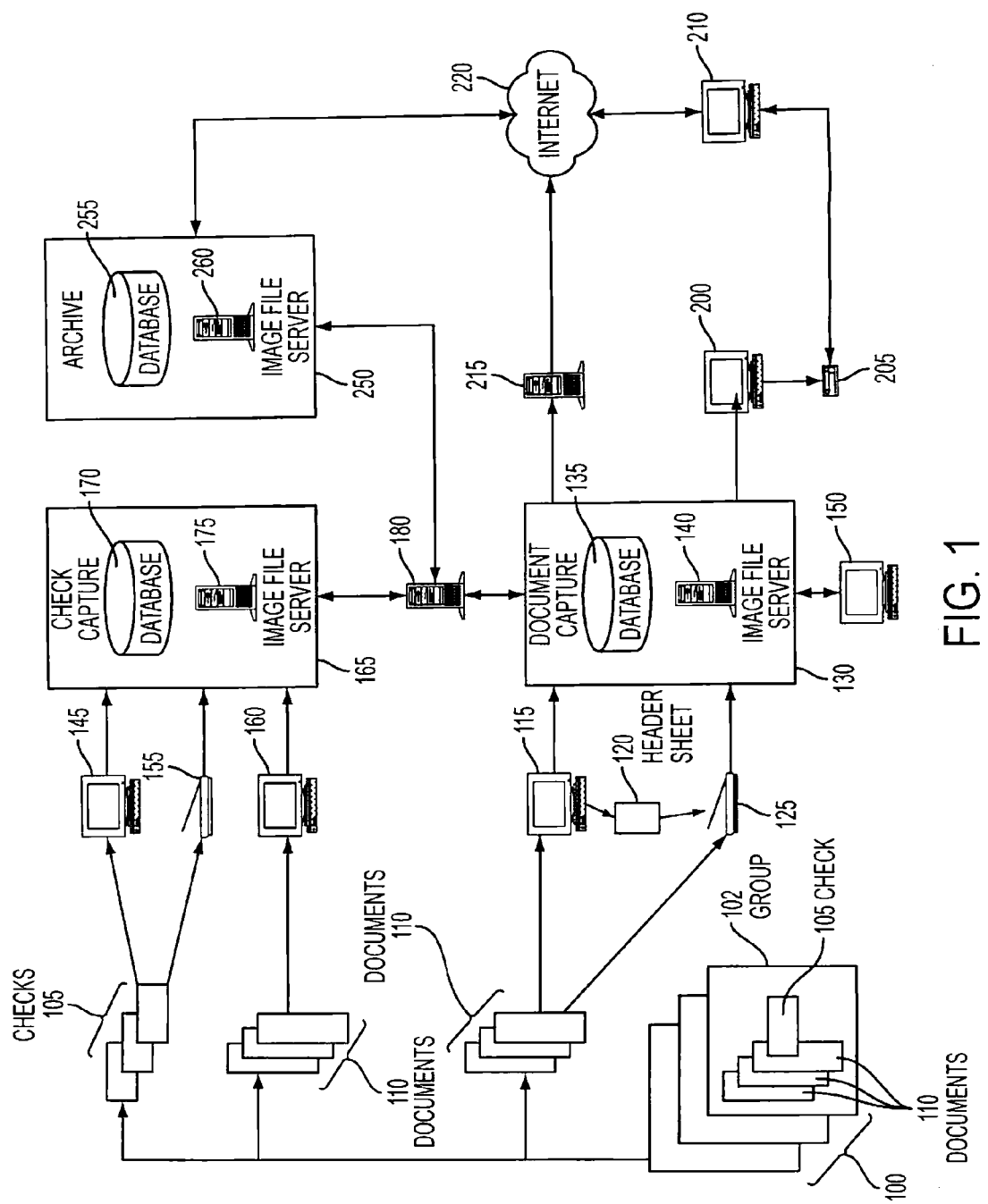
FIG. 1 illustrates the system of the present invention including the flow of data therethrough.

FIG. 1 illustrates the system of the present invention as well as the flow of data through the system and to customers. Incoming groups of checks and their associated documents 102 are received and manually opened by an operator. Each group consists of at least one check 105 and at least one document 110 associated with the check. The documents 110 typically consist of an invoice reflecting the amount due pursuant to which the check 105 was issued, an envelope, and other documents associated with the payment reflected in the check 105. Several of the groups 102 of checks and documents are processed together as a batch 100.

Figure 2:
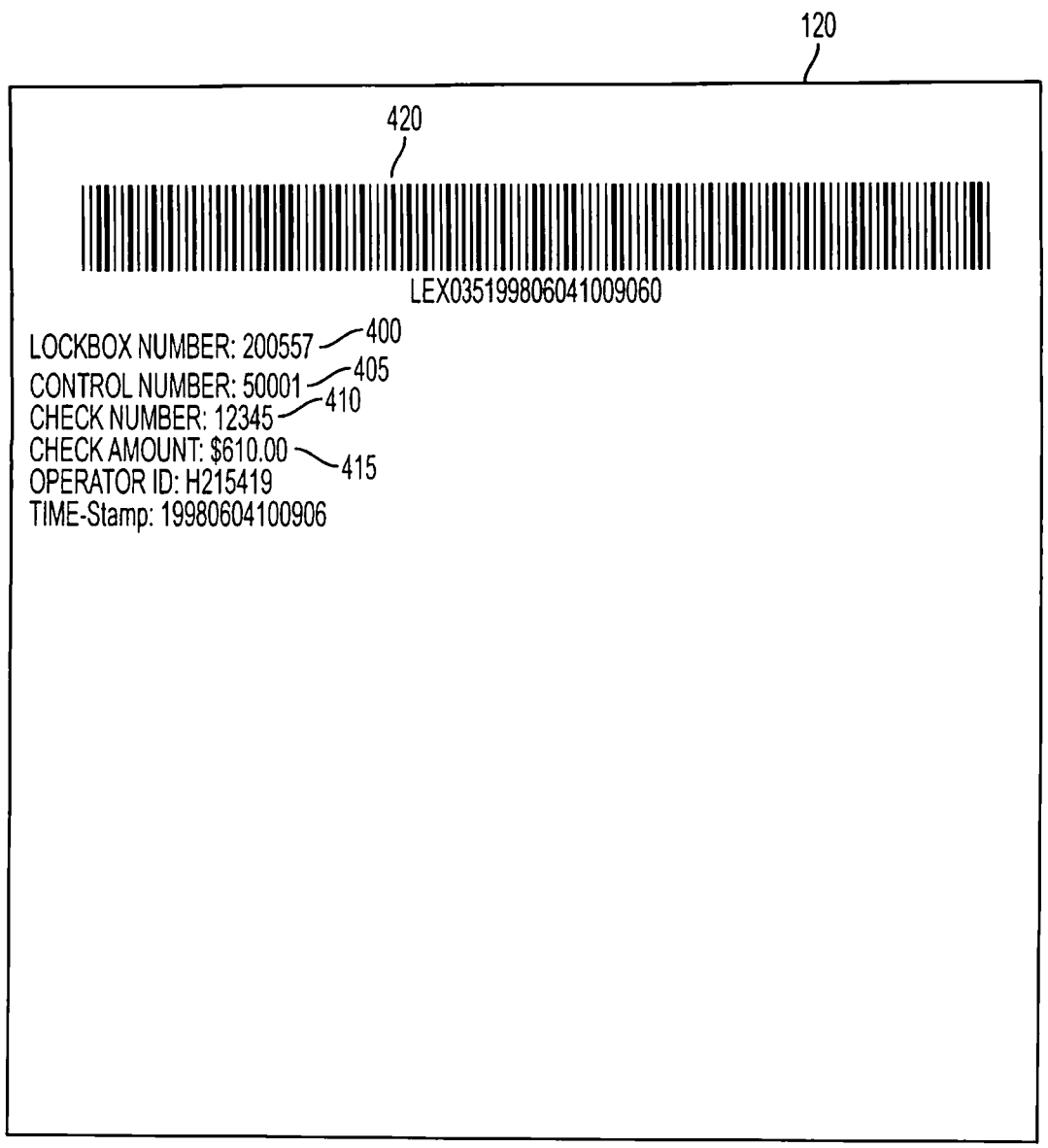
FIG. 2 depicts a header sheet for scanning documents.

Before the check 105 and documents 110 are physically separated as a group 102, the operator uses workstation 115 to generate a header page 120 that is subsequently used to identify the images of the documents 110. A sample header page 120 is depicted in FIG. 2. In order to generate the header page 120, the operator enters the lockbox number 400 for the customer associated with the batch 100 and the number 410 of the check 105 contained in the particular batch 100 being processed. The system automatically assigns a control number 405 to the batch 100. Optionally, the operator can enter the amount 415 of the check. Once the data has been entered into workstation 115, the workstation 115 prints out the header sheet 120 containing the document information. In a preferred embodiment, the header sheet also contains a bar code 420 that contains the above described information that uniquely describes the batch 100 being processed. In an alternative embodiment of the present invention, a two dimensional bar code is used on the header sheet 120. This alternative bar code is organized in a two dimensional matrix and is able to contain twice as much information as the one dimensional bar code 420 illustrated in FIG. 2.

Returning to FIG. 1, the header sheet 120 is placed in front of the stack of documents 110 associated with the group 102 being processed. This process is repeated for each incoming group 102 within the batch 100. The header sheets 120 for each of the groups 102 functionally serve to act as a divider between the stacks of documents 110 contained in the different groups 102 within a batch 100. Once the information for generating the header sheet 120 has been entered as described above, and the header sheets have been printed (or the data saved for subsequent printing) the checks 105 may be separated from their associated documents 110 and sent to the check processing portion of the system of the present invention as further described below.

When the stack of documents 110 separated by header sheets 120 for each of the groups 102 have been assembled, they are ready for scanning using an optical scanner 125. In a preferred embodiment of the present invention, scanner 125 is a high speed scanner such as those available from Bell & Howell™. The output of scanner 125 are image files representative of the header page 120 and the documents 110. The image files are stored on the image file server 140 in the Document Capture memory 130. After the scanning process has been completed and the images of the documents 110 and header pages 120 are stored on the image file server 140, processor 180 performs a bar code recognition process on the scanned images. This bar code recognition process reads and recognizes the bar code 420 (see FIG. 2) contained on the header sheet 120. The bar code 420 is preferred as opposed to plain text information printed on the header sheet 120, since a convention Optical Character Recognition process is not as accurate a the preferred bar code recognition process.

In an alternative embodiment of the present invention, the customer who utilizes the lockbox processing service of the present invention imprints a bar code on the each of the documents 110 that it sends to its customers (for eventual remittance back to the system of the present invention). The inclusion of the such a bar code on each of the documents 110 would greatly speed the association process as further described below. When such a bar code is imprinted on the documents 110, processor 180 is able to read and recognize each document 110, thereby obviating the need for any data entry with respect to the documents (as described below). Naturally, any documents that originated from the remitter (e.g., a letter) would not have such a bar code imprinted thereon and thus require the full processing of the system of the present invention as described herein.

As the images of the stack of papers is being processed by processor 180, once the processor 180 recognizes and reads the batch information from a header sheet 120, the logic in the processor 180 is programmed to "know" that the images of the sheets following the header sheets are documents 110 representing a group 102. The batch information from the recognized header sheet 120 is temporarily stored by processor 180. As an image of a document 110 is processed, processor 180 uses the stored the batch information (from the header sheet 120) to generate a unique key that is appended to the image. The key is subsequently used, as described below, to identify the images during the process of associating all the data records and images for a group 102. In a preferred embodiment, the images are stored in a Tagged Image File Format (TIFF) on the image file server 140. Alternatively, the image can be stored in other formats such as JPEG or GIF. The processing of the images continues until the processor 180 recognizes the header sheet 120 for the next group 102 contained in the stack of papers being scanned. At that point, the just described process is repeated for the header 120 and documents 110 representing the next group 102.

If the processor 180 properly reads the bar code 420 from the header sheet 120 and generates and appends the key to each of the images for all the documents 110 in a group 102, the image of the header sheet 120 is discarded. If the processor 180 cannot properly read the bar code 420 from the header 120, the image of the header sheet 120 and the images of the subsequent documents 110 are temporarily stored on the image file server 140. After the scanning process is complete for all of the papers in the stack, (or alternatively during real time during the scanning process) an operator of workstation 150 is notified that some of the images have not been identified and is prompted to repair the images. The unidentified image of a header sheet 120 is displayed on the screen of the workstation 150 for viewing by the operator. The operator is then able to view the text of the lockbox number 400, control number 405 and check number on the image of the header sheet 120 (see FIG. 2). Using this information, the operator is able to manually repair the header 120 information. Once repaired, the document capture system 130 is then able to key each of the images of the documents 110 associated with the previously unreadable image of the header sheet 120.

In parallel with the above described scanning process of documents 110, the checks 105 from each of the groups 102 are processed. Checks 105 are processed similar to the processing of documents 110. Workstation 145 is used to capture the data from each check 105 for inclusion in database 170 in the check capture memory 165. In a preferred embodiment, database 170 is an Oracle™ database. A data record is generated in database 170 for each check 105. In a preferred embodiment, workstation 150 includes a Magnetic Ink Character Recognition (MICR) reader which reads the MICR line contained on a check 105. In addition to capturing the data from the check, each check 105 is imaged using scanner 155. The check images are then stored on an image file server 175 and the check images are linked to their respective check data record in database 170.

Workstation 160 is used by an operator to manually input data from each document 110. As with the check data, a separate data record is generated for each document 110 and is included in database 170. The data captured from each document 110 includes for example, the invoice number contained on the document 110. The documents 110 are available for processing at workstation 160 either before or after they have been scanned by scanner 125 into the document capture system 130. There is no preferred order of scanning and manual data entry. The scanning of documents 110 can occur first or the data entry from documents 110 can occur first. In an alternative embodiment of the present invention, the workstation 160 is coupled to the document capture memory 130, and the data from documents 110 is inputted into database 135.

In addition to the bar code recognition process and image keying process described above, processor 180 is further used to import the check and document data and the check images from the check capture memory 165 into the document capture memory 130 so that the all of the data records (both check and document) and images (checks) for each group 102 can be associated and cross referenced. In performing this operation, processor 180 continuously parses the directories of the check capture memory 165 in order to detect any new or updated files. If such files are detected, processor 180 imports the files from check capture memory 165 into document capture memory 130.

Once the data records (both check and documents) and images (checks) have been retrieved from the check capture memory 165 and stored in the document capture memory 130, an association process takes place. This association process ensures that the check data, the document data, the check images, and each of the document images are all properly associated. Proper association means that all of the data and images reflect a group 102 as it was received by the system.

Figure 3:
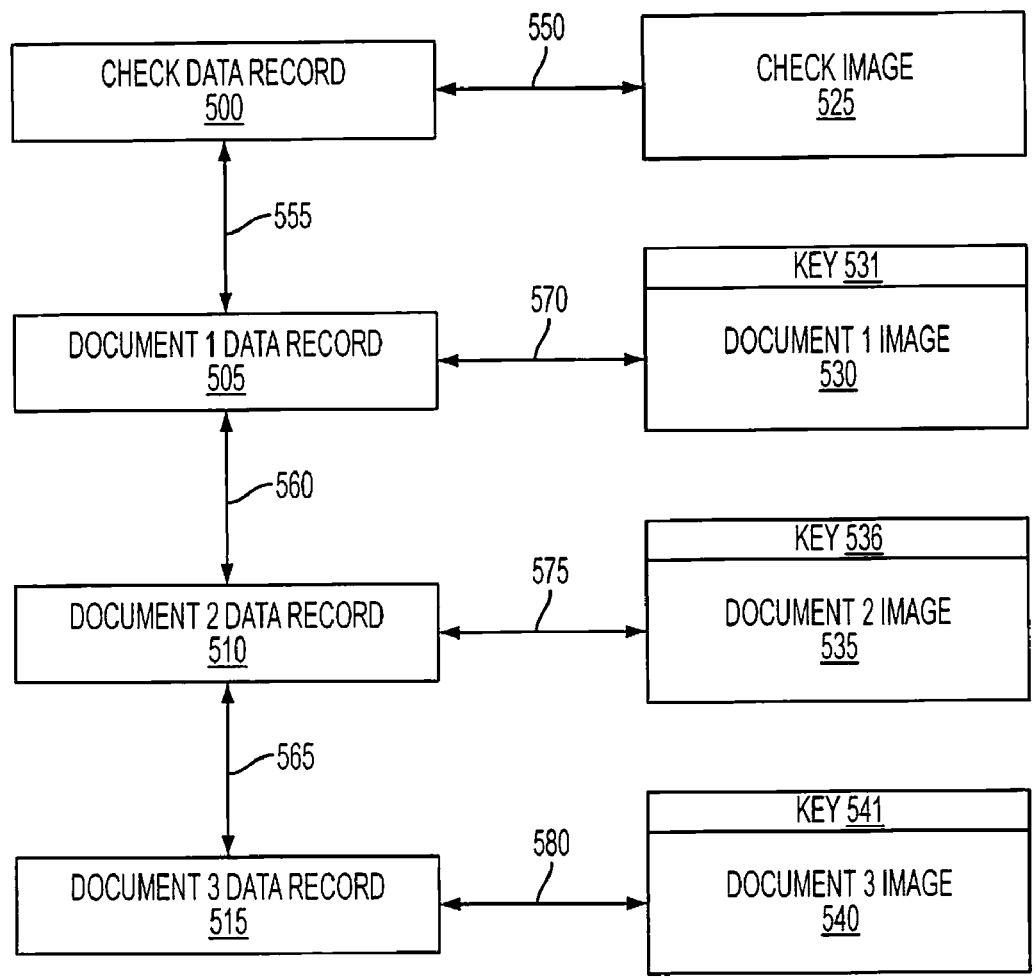
FIG. 3 illustrates the association of data records and images.

FIG. 3 illustrates an example of the association process. The association process is for the most part automatic. The check data records 500 and the check images 525 have already been properly associated (link 550) by the check capture system 165. The document data records 505–515 are automatically linked to each other and the check data records 500 using standard database techniques (see links 555–565). The linkage between data records 500 and 505–515 can be accomplished for example through the use of a common data field (e.g., check number).

If there is only a single document in the group 102 or if there is a single data record 505–515 for several documents in a group, the entire process is automatic. In this single document or single data record example, the files that are imported from check capture system 165 include a check data record 500, a check image 525 and a document 1 data record 505. During the association process, the document capture system 130 searches the image database 140 (see FIG. 1) for documents that have a key corresponding to the check number (or batch number or check amount) reflected in check data record 500. During this search system 130 will only find the document image(s) 530 with a key 535 that matches. Accordingly, system 130 knows that document 1 data record 505 has to correspond to the document 1 image(s) 530 and creates the logical connection 570. In this manner the check data record 500, the check image 525, the document 1 data record 505 and the document 1 image 530 are all logically associated and the association process is complete.

A difficulty occurs when there is more than one document 110 contained in a group 102 that generate more than one document data record 505–515. In the particular example depicted in FIG. 3, when system 130 is searching for document images with keys corresponding to check data record 500, it will find three document images 530, 535 and 540. The system could directly associate the document images 530, 535 and 540 with the check data record 500, but no one would know which of the document data records 505, 510, 515 correspond to which of the document images 530, 535 and 540. For example document 1 might be the first page of an invoice, document 2 is the second page of the invoice and the third document is the third page of the invoice. The three document data record each correspond respectively to one of the three pages of the invoice and the three document images 530, 535 and 540 are images of the three pages, but system 130 has no means of properly automatically associating the correct data record with the correct image.

In order to solve this problem, system 130 presents an operator at workstation with a screen containing both the unmatched document data records 505 and thumbnail prints of the unmatched document images 530, 535 and 540. The user is then able to select the thumbnail of a document image 530, 535 and 540 in order to enlarge it. Viewing the full size rendering of the document image 530, 535 and 540, the user is then able to manually associate the document image 530, 535 and 540 with the proper document data record 505–515. This process is repeated for each document image 530, 535 and 540 and document data record 505–515 until the operator has manually created the logical links 570, 575 and 580. In the alternative embodiment described above, if each of the documents have a bar code imprinted thereon, the data Returning to FIG. 1, the document capture memory 130 maintains the associated data records and images for all batches 100 for a period of preferably 60 to 90 days, depending on the amount of storage contained in document capture memory 130. Periodically, the data and images stored in memory 130 are transmitted using server 180 to a permanent archive 250. The associated data records and images are organized according to lockbox customers. The system is able to deliver the data records and images to the customer in a number of ways. In a first embodiment of the present invention, workstation 200 is used to retrieve all of the data and images with respect to a particular customer and place these records and images on a Compact Disc Read Only Memory (CD-ROM) using a CD-ROM writing device 205. Once "burned" with all of the data and images for a customer, the CD-ROM thus generated is shipped via conventional means (U.S. mail, Federal Express™, etc.) to a customer for display on a customer workstation 210. The generation of such a CD-ROM can occur as often as desired by a customer such as on a daily, weekly or monthly basis.

In a second alternative delivery method according to the present invention, workstation 215 is used to create a bulk electronic file of all of the data and images for a customer. This bulk file is preferable encrypted for security purposes and transmitted to the customer over the public Internet 220. In another alternative embodiment, this bulk file can be transmitted to the customer using a private network (e.g., Value Added network (VAN)) or other dial up connection between workstation 215 and the customer system 210.

In another alternative method of allowing a customer access to its data and images, the user connects to archive 250 through the public Internet 220. The connection process provides for adequate security and authentication of a user as well know to those skilled in the art. Using standard browsing techniques, the customer is able to search for, retrieve, sort, download and print data records and images desired by the customer.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lockbox processing method comprising the steps of:
    receiving a check and at least one document associated the check, the check and at least one document forming a group, the check having a check number associated therewith;
    generating identifying information, the identifying information containing at least the check number;
    optically scanning at least one document to generate a document image;
    associating the document image with the identifying information;
    optically scanning the check to generate a check image;
    generating a check data record containing at least the check number;
    generating a document data record containing document information that identifies at least one document; and
    logically associating the check data record, the document data record, the check image and the document image;
    wherein the step of generating the identifying information further comprises the steps of:
    encoding the identifying information into a bar code;
    printing the bar code on a header sheet;
    optically scanning the header sheet to generate a header sheet image; and
    performing a bar code recognition process on the header sheet image to recognize the identifying information.

2. The method of claim 1, wherein the step of associating the document image with the identifying information further comprises the steps of:
    using the identifying information to generate a key;
    and appending the key to the document image.

3. The method of claim 1, wherein the step of logically associating the check data record, the document data record, the check image and the document image is automatic.

4. The method of claim 1, further comprising the step of providing a customer with access to the check data records, the document data records, the check images and the document images associated with the customer.

5. The method of claim 1, wherein there are a plurality of documents associated with the check, the method further comprising the steps of:
    optically scanning the plurality of documents to generate a plurality of document images;
    associating the plurality of document images with the identifying information;
    generating a document data record for each of the plurality documents; and
    logically associating the check data record, the document data records, the check image and the document images.

6. A lockbox processing method comprising the steps of:
    receiving a check and at least one document associated with the check, the check and the at least one document forming a batch, the check having a check number associated therewith;
    generating a header sheet containing identifying information, the identifying information containing the check number;
    optically scanning the header sheet and the document to generate an image of the document, denoted as a document image, and to generate an image of the header sheet, denoted as a header sheet image;
    performing optical character recognition on the header sheet image to thereby recognize the identifying information;
    generating a key using the recognized identification identifying information;
    associating the key with the document image;
    optically scanning the check to generate an image of the check, denoted as a check image;
    generating a check data record containing the check number;
    generating a document data record containing document information that identifies the document; and
    logically associating the check data record, the document data record, the check image and the document image.

* * * * *